United States Patent [19]

Jeuffray et al.

[11] Patent Number: 5,067,546
[45] Date of Patent: Nov. 26, 1991

[54] ROLLER BLIND FOR A MOTOR VEHICLE AND PROCESS FOR THE PRODUCTION THEREOF

[75] Inventors: Jean-Marie Jeuffray; Ouvrard Gaston, both of Bressuire, France

[73] Assignee: ETS Farnier & Penin, Bressuire, France

[21] Appl. No.: 509,815

[22] Filed: Apr. 17, 1990

[30] Foreign Application Priority Data

Apr. 19, 1989 [FR] France ................ 89 05204

[51] Int. Cl.$^5$ .................................. E06B 9/08
[52] U.S. Cl. ........................ 160/23.1; 160/262; 160/370.2
[58] Field of Search ............ 160/23.1, 262, 387, 160/405, 370.2, 396, 399, 400, 401, 402; 296/97.8, 14.3, 37.16

[56] References Cited

U.S. PATENT DOCUMENTS

| | | | |
|---|---|---|---|
| 1,782,905 | 11/1930 | Mohun et al. | 160/387 |
| 1,958,695 | 5/1934 | Claus | 160/387 X |
| 2,350,235 | 5/1944 | Johnson | 160/387 |
| 2,751,977 | 6/1956 | Pinkerton | 160/262 X |
| 2,855,241 | 10/1958 | Walter | 160/23.1 X |
| 2,927,819 | 3/1960 | Johnson | 160/23.1 X |
| 3,069,198 | 12/1962 | Winn | 160/262 X |
| 3,075,805 | 1/1963 | Golde et al. | 160/262 X |
| 3,092,174 | 6/1963 | Winn | 160/262 |
| 4,823,859 | 4/1989 | Park | 160/262 X |
| 4,869,542 | 9/1989 | Lin | 296/97.8 |

FOREIGN PATENT DOCUMENTS 1381059 1/1964 France .
2118115 10/1983 United Kingdom .

*Primary Examiner*—David M. Purol
*Attorney, Agent, or Firm*—Griffin, Branigan & Butler

[57] ABSTRACT

A roller blind for a motor vehicle comprises a housing with a guide slot through which extends a strip of flexible material fixed to and capable of being wound on to a straight roller member. A pull bar is fixed to the free end of the strip, for extending the roller blind from the retracted condition. The guide slot and the pull bar are of curved configuration with substantially identical degrees of curvature.

6 Claims, 2 Drawing Sheets

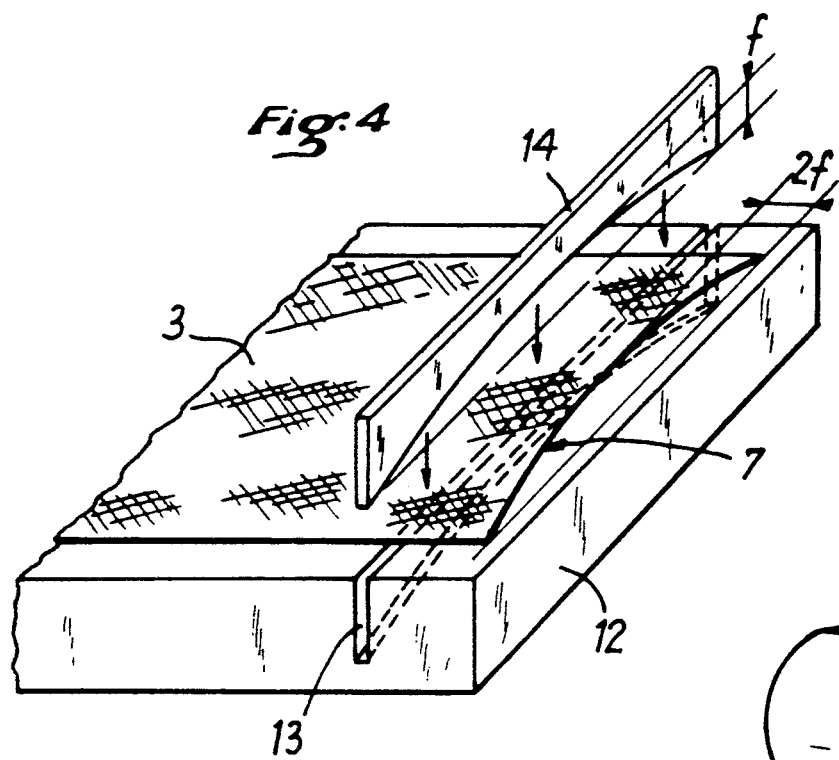
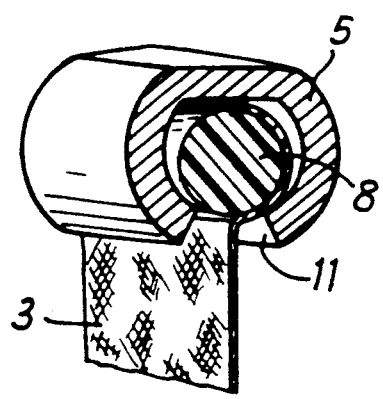
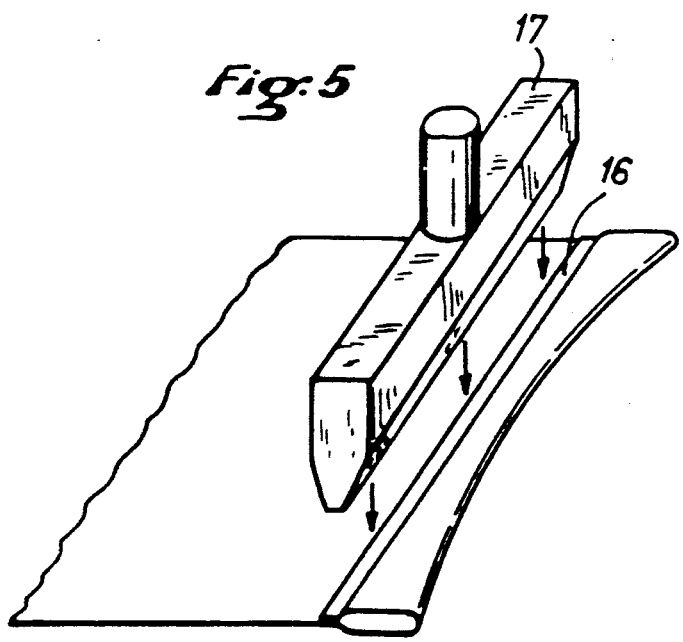
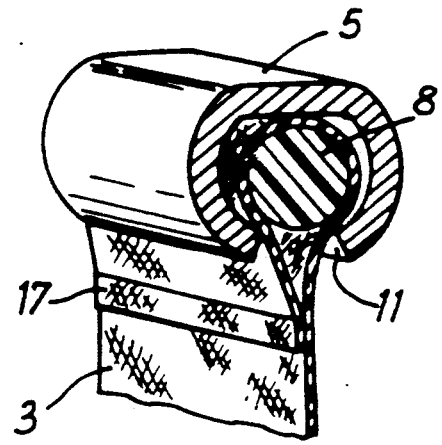

ROLLER BLIND FOR A MOTOR VEHICLE AND PROCESS FOR THE PRODUCTION THEREOF

BACKGROUND OF THE INVENTION

In view of the modern trend to increasing the area of the windows of motor vehicles and arranging the windows of motor vehicles in increasingly sloping positions in order to achieve satisfactory aerodynamic performance, it is becoming more and more necessary to provide a blind arrangement in the region of the rear window of which will protect the necks of the passengers in the back seats of the vehicle from the effects of sunshine. Blinds which can be used for that purpose are typically in the form of a roller-type blind comprising a housing which is generally fixed to the rear window shelf of the vehicle, the housing having a guide slot through which extends a strip of flexible material of which one end is fixed to a straight winding member disposed within the housing. One end of the strip of material extends to the outside of the housing through the slot and is fixed to a pull bar member which is also straight and which, in a retracted position of the blind in which the strip of material is disposed within the housing, closes the guide slot relative to the exterior.

In addition however, further to enhance the aerodynamic performance of a motor vehicle, automobile designers have a tendency at the present time to arrange for the windows of a vehicle to be of a generally curved configuration. In that situation however the above-discussed roller blind in which the strip of material which is unwound from the housing of the blind is disposed in a plane and is therefore flat, is poorly suited to use in relation to a curved window. More specifically the blind cannot closely conform to the curved configuration of the window by virtue of the difference in curvature between the window and the flat blind. On the other hand the pull bar cannot conform to the shape of the top edge of the window assembly so that, even when the blind is in the extended position, there is a gap between the blind and the edge of the window, through which sunshine can pass and thus cause difficulties for the passengers in the rear seats of the vehicle.

While it has been envisaged that the pull bar of the roller-type blind discussed above may be curved in order to conform to the shape of the upper edge of the window assembly to be covered by the blind, the curve of the upper edge of the window assembly is of a complex configuration which has both curvature in the plane of the window and curvature in a plane which is inclined with respect to the plane of the window. Moreover the guide slot provided in the housing of the blind is generally arranged in one plane so that it is deemed that a pull bar which would conform to the shape of the upper edge of the window would not coincide with the guide slot when the blind is in a retracted position. That is considered to be a major disadvantage as the pull bar must be capable of fitting into the guide slot in the retracted condition of the blind in order for the blind in the retracted condition to be entirely contained within the housing in order to protect it.

SUMMARY OF THE INVENTION

An object of the present invention is to provide a roller blind which is at least partially adapted to a curved window and the blind member of which can be entirely contained within the housing of the blind in the retracted condition thereof.

Another object of the present invention is to provide a roller blind for a motor vehicle window, which affords greater flexibility of use in terms of adaptation to the respective motor vehicle structure.

Still another object of the present invention is to provide an improved roller blind which effectively covers a window in a motor vehicle to provide protection for the interior thereof while being of a simple and reliable configuration.

A further object of the invention is to provide a process for use in the production of a roller blind, which is of a simple nature while reliably affording a satisfactory result suited to the nature of the blind.

In accordance with the present invention, those and other objects are attained by a roller blind comprising an elongate housing having a guide slot through which extends a strip of flexible material or fabric of which one end is fixed to a straight roller member disposed within the housing. The other end of the strip extends to the exterior of the housing and is fixed to a pull bar, wherein the guide slot in the housing and the pull bar are of substantially identical curvatures.

As will be seen in greater detail hereinafter with reference to preferred embodiments of the invention, with the structure in accordance with the principles of the present invention the portion of the strip of flexible material which corresponds to the curvature of the pull bar is entirely contained within the housing when the blind is in the retracted condition and is thus suitably protected, with the pull bar being itself fitted into the guide slot. It has been found that, even in the case of a guide slot and a pull bar which are curved in one plane, it is possible in the extended position of the blind for the pull bar to be disposed in such a way that it has a curvature in two different planes, by simply inclining the catch or hooking means on the pull bar for holding the blind in position, in order for the pull bar in consequence to be able to assume an inclined position.

In accordance with a preferred feature of the invention, at its end which is fixed to the pull bar the flexible strip comprises a curved cut having a degree of curvature which is substantially equal to the degree of curvature of the pull bar, and is fixed to a rod member which is itself engaged into a tubular pull bar. That design configuration provides that the strip of flexible fabric or material is connected to the pull bar in a particularly neat and tidy fashion.

In accordance with another aspect of the invention, for the purposes of providing a roller blind according to the invention, a process for fixing a piece of material or fabric to a pull bar of the roller blind according to the invention comprises the steps of producing at one end of the strip a cut having a curve with a degree of curvature which is substantially equal to the degree of curvature of the pull bar, arranging a flexible rod member in a shaping means so that it is of a curved configuration with a degree of curvature substantially equal to that of the pull bar, fixing the flexible material to the flexible rod member in tangential relationship therewith along the curved edge of the cut of the material, and engaging the flexible rod member and the end portion of the material or fabric which is fixed thereto into a rigid tubular curved pull bar having a lateral opening through which the material or fabric extends therefrom.

In accordance with a preferred form of the roller blind according to the invention, at its end which is fixed to the pull bar the flexible material comprises a hem having a straight edge and a curved fold with a degree of curvature which is substantially equal to the degree of curvature of the pull bar, and a rod member is disposed within the hem, the rod member and the fold of the hem being engaged in the pull bar.

In accordance with a further aspect of the invention, and in regard to the above-outlined preferred embodiment a process is provided for fixing the flexible material or fabric to the pull bar, which process comprises the steps of producing at one end of the material a cut having a curved edge with the degree of curvature being substantially double the degree of curvature of the pull bar, folding the material over on to itself by means of a shaping member having a curved edge with a degree of curvature which is substantially equal to that of the pull bar, fixing together two facing thickness of material in the vicinity of the edge of the cut, to form a hem engaging a rod member into the hem and engaging the hem and the rod member into a rigid curved tubular pull bar having a transverse slot through which the material extends.

It has been found that that procedure is particularly advantageous as, when the material is folded by means of the shaping member having a curved edge, the material is deformed and the edge thereof resumes a straight configuration so that fixing of the two oppositely disposed thicknesses of material to form the hem is effected along a straight line, in a procedure which is particularly easy to carry into effect.

Further objects, features and advantages of the invention will be apparent from the following description of preferred embodiments thereof.

BRIEF DESCRIPTION OF THE DRAWINGS

FIG. 3 is a view in section taken along line A—A in FIG. 1 showing some details of the attachment of the strip to the roller, FIGS. 4 and 5 are diagrammatic perspective views illustrating a second embodiment of the fixing process according to the teachings of the invention, and FIG. 6 is a view in section taken along line A—A in FIG. 1 showing different details of the attachment of the strip to the roller.

DESCRIPTION OF PREFERRED EMBODIMENTS

Figure 1:
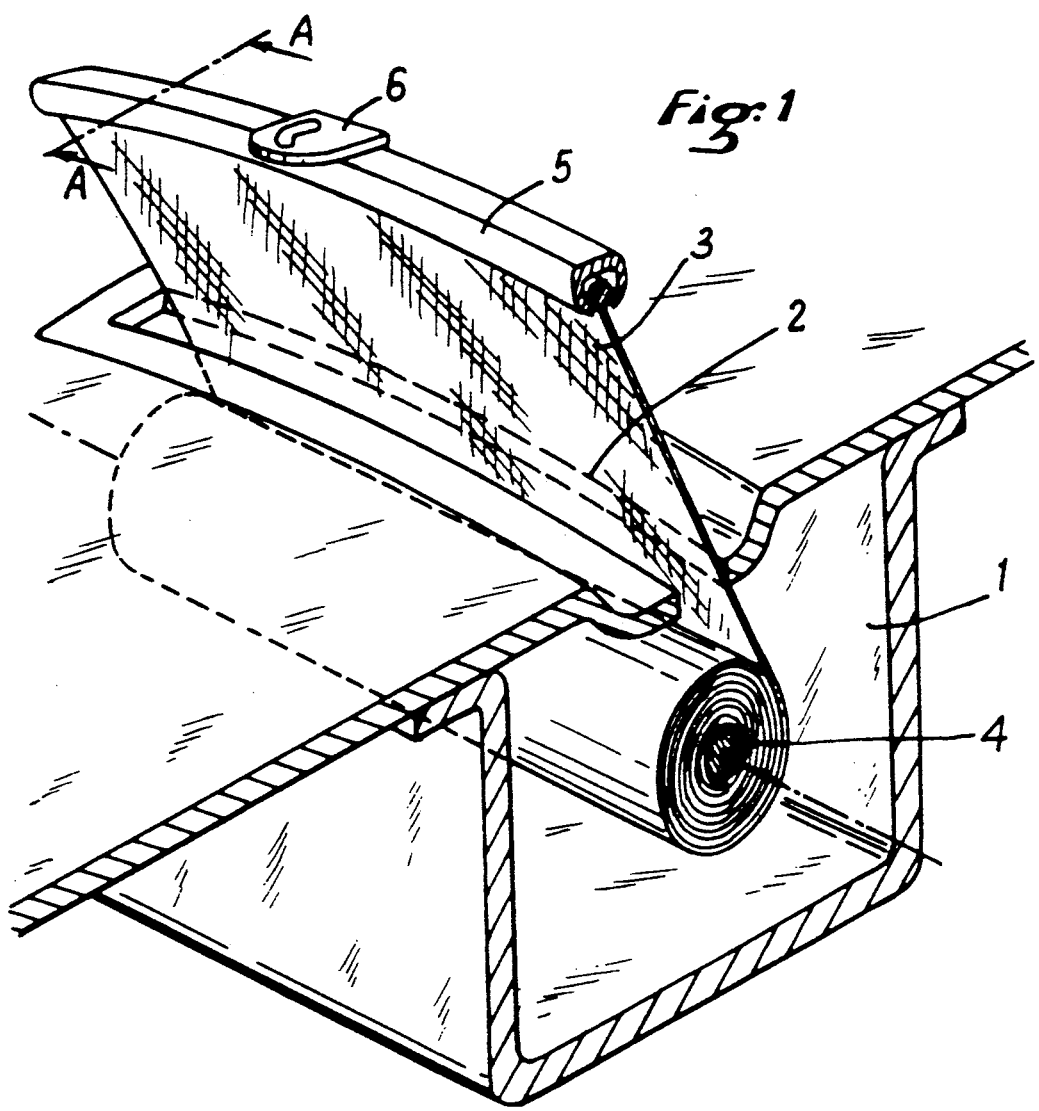
FIG. 1 is a perspective view in section of part of a roller blind according to the invention.

Referring firstly to FIG. 1, a roller blind according to the invention comprises a housing 1 providing an internal space (not referenced), with a guide slot 2 in the upwardly facing wall portion of the housing 1. The roller blind further comprises a strip 3 of suitable flexible fabric or material which extends outwardly of the housing 1 through the guide slot 2. One end of the strip 3 is fixed to a straight roller member 4 disposed in the space within the housing 1, while the other end of the strip 3, which as mentioned extends outwardly of the housing 1 through the guide slot 2, is fixed to a pull bar 5 fitted with a catch or engagement means 6.

The guide slot 2 and the pull bar 5 are of a curved configuration with the degree of curvature of the guide slot 2 being identical to that of the pull bar 5. In the embodiment illustrated in FIG. 1 the guide slot 2 is contained in one plane while the pull bar 5 is also curved in a single direction. It will be noted that nonetheless the pull bar 5 can conform with a good degree of approximation to the top edge of a window having curvatures in two different planes, by arranging the catch means 6 at an angle with respect to the strip 3 to which the pull bar 5 is fixed. Thus, once the blind has been latched in the extended position thereof, by means of the catch means 6, the pull bar 5 is in an equilibrium position in which it is inclined with respect to the strip 3, and therefore has a curvature both in a horizontal plane and in a vertical plane.

Figure 2:
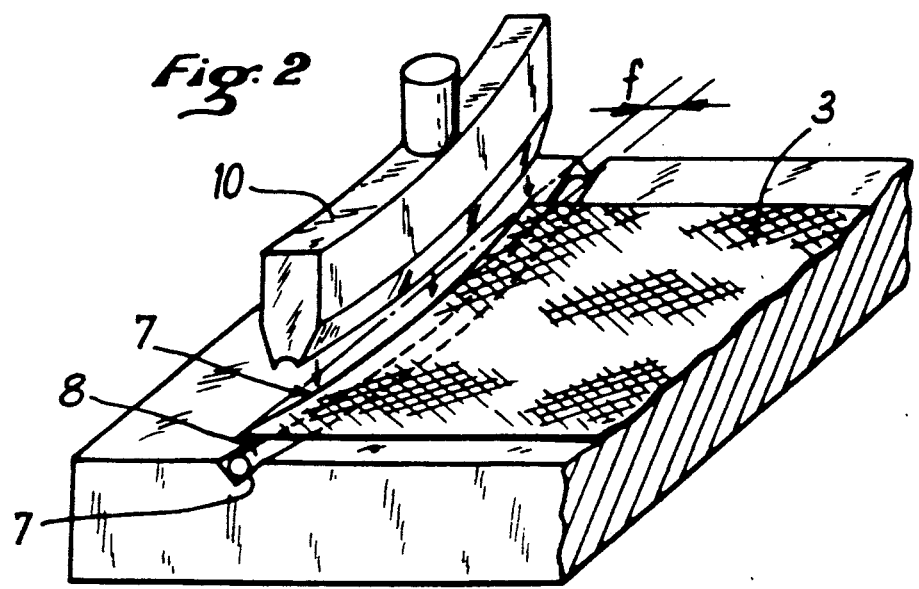
FIG. 2 is a partial perspective view illustrating a fixing process in accordance with a first embodiment of the process of the invention.

Reference is now made to FIGS. 2 and 3 illustrating a first embodiment of a manner of fixing the material strip 3 to the pull bar 5. In this embodiment the material 3 is first cut off at one end along a cut line 7 having a curvature with a degree of curvature as indicated at f equal to the degree of curvature of the pull bar 5. In, addition, a flexible rod member 8 is disposed in a shaping means, e.g. in a groove of V-shaped configuration which is also curved with a degree of curvature f, in such a way that the rod member 8 is of an identical shape to the cut line 7 of the strip 3. The edge of the strip 3 with the cut line 7 is then fixed to the flexible rod member 8. In the case in which the material is a glass fibre material covered with polyvinyl chloride, the flexible rod member 8 is preferably also of polyvinyl chloride and the material 3 is then fixed to the rod member 8 by ultrasonic welding using an electrode as indicated diagrammatically at 10, having a curved lower edge with a degree of curvature equal to that of the end edge of the material 3. The material is thus fixed to the flexible rod member 8 tangentially with respect thereto along the curved edge provided by the cut line in the material. Once the material 3 has been fixed to the flexible rod member 8, the assembly thereof is longitudinally engaged into a rigid tubular pull bar 5 having a lateral opening as indicated at 11 in FIG. 3, through which the material 3 extends. When it is introduced into the pull bar 5, the rod member 8 is automatically oriented to conform to the curvature of the pull bar 5.

Reference will now be made to FIGS. 4 through 6 showing a second embodiment of the invention in which the strip of material 3 is firstly cut at one of its ends along a cut line as indicated at 7 in FIG. 4, which in this case has a degree of curvature as indicated at 2f double the degree of curvature f of the pull bar 5 and the guide slot 2 in the housing 1 of the roller blind. The end of the material 3 with the cut line 7 is then disposed over a hemming device as diagrammatically indicated at 12 comprising a slot 13 therein, and the material 3 is folded over on to itself by means of a shaping member 14 comprising a curved edge with a degree of curvature f equal to that of the pull bar 5. In that operation the end edge of the material 3 is deformed and, after folding, the end edge thereof is of a straight configuration so that the two oppositely disposed thicknesses of material can be easily fixed together in the vicinity of the cut line by a straight join, for example by producing a straight welded seam as indicated at 16 in FIG. 5 by means of an ultrasonic welding electrode 17 with a straight bottom edge. A flexible rod member 8 is then fitted into the hem and the hem with the flexible rod member 8 therein are engaged into a curved rigid tubular pull bar 5 with a lateral opening 11 through which the material 3 extends outwardly therefrom.

It will be appreciated that the above-described invention has been set forth solely by way of example and illustration thereof and that various modifications and alterations may be made therein without thereby departing from the spirit and scope of the invention. For example, although the roller blind according to the principles of the invention has been described in connection with a housing having a guide slot 2 which is formed in one plane, it is possible without departing from the scope of the invention to provide a rolling arrangement comprising an upper wall which is shaped in accordance with a curved surface in which a curved guide slot is also provided, the pull bar then being of a curved configuration with a degree of curvature in two different planes. Furthermore, although the rod member 8 in the above-described embodiments is flexible, it is also possible to use a rigid rod member of a curvature with a degree of curvature equal to that of the pull bar. The blind can be used in relation to any window of a motor vehicle and in particular a rear window.

We claim:

1. A roller blind suitable for substantially covering a curved motor vehicle window, comprising a housing have a guide slot, a straight roller member rotatably disposed within the housing, a single strip of flexible material of dimensions suitable for substantially covering a curved window of a motor vehicle and having a first end fixed to the roller member and a second end extending to the exterior of the housing through the slot, and a pull bar fixed to the second end of the strip, the guide slot and the pull bar being of curved configuration with substantially identical curvatures, and catch means attached to the pull bar at an angle with the strip end adjacent to the pull bar.

2. A blind as set forth in claim 1 wherein the pull bar is tubular and wherein at the second end of the strip, the strip comprises a curved cut line having a degree of curvature which is substantially equal to the degree of curvature of the pull bar, and further including a rod member engaged into the pull bar.

3. A roller blind as set forth in claim 1 wherein at the second end of the strip, the strip comprises a hem with a straight edge and a curved fold which has a degree of curvature substantially equal to the degree of curvature of the pull bar, and further including a rod member disposed within the hem, the rod and the fold of the hem being engaged in the pull bar.

4. A process for fixing a portion of material to a pull bar to provide a roller blind as set forth in claim 2, comprising the steps of producing at one end of the material a cut line having a curved edge with a degree of curvature which is substantially equal to the degree of curvature of the pull bar, arranging a flexible rod member in a shaping means so that it is in a curved configuration with a degree of curvature substantially equal to the degree of curvature of the pull bar, fixing the material to the flexible rod member in tangential relationship therewith along the curved edge of the cut line of the material, and engaging the flexible rod member and the end of the material fixed thereto into a rigid curved tubular pull bar having a lateral opening through which the material extends.

5. A process as set forth in claim 4 wherein the flexible rod member and the material are made of polyvinyl chloride and the material is fixed to the rod member by ultrasonic welding.

6. A process for fixing a portion of material to a pull bar to provide a roller blind as set forth in claim 3, comprising the steps of producing at one end of the material a cut line having a curved edge with a degree of curvature which is substantially double the degree of curvature of the pull bar, folding the material over on to itself by means of a shaping member comprising a curved edge with a degree of curvature which is substantially equal to the degree of curvature of the pull bar, fixing two oppositely disposed thicknesses of material together in the vicinity of the edge with the cut line of the material, engaging a rod member into the hem and engaging the hem and the rod member into a rigid curved tubular bar having a lateral slot through which the material extends.

* * * * *